US009411782B2

(12) United States Patent
Harris et al.

(10) Patent No.: US 9,411,782 B2
(45) Date of Patent: Aug. 9, 2016

(54) REAL TIME WEB DEVELOPMENT TESTING AND REPORTING SYSTEM

(71) Applicant: ADOBE SYSTEMS INCORPORATED, San Jose, CA (US)

(72) Inventors: Mike Harris, Santa Rosa, CA (US); Charles C. Scheinost, Forest Knolls, CA (US); Tom Juhasz, Bainbridge Island, WA (US); Matthew Hamlin, San Francisco, CA (US); Amit Kishnani, Foster City, CA (US); Bruce Bowman, San Jose, CA (US); Joshua Hatwich, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 499 days.

(21) Appl. No.: 13/673,792

(22) Filed: Nov. 9, 2012

(65) Prior Publication Data
US 2014/0136944 A1    May 15, 2014

(51) Int. Cl.
*G06F 17/00* (2006.01)
*G06F 17/21* (2006.01)
*G06F 17/22* (2006.01)
*G06F 17/27* (2006.01)
*G06F 17/30* (2006.01)

(52) U.S. Cl.
CPC .......... *G06F 17/211* (2013.01); *G06F 17/2211* (2013.01); *G06F 17/2725* (2013.01); *G06F 17/3089* (2013.01)

(58) Field of Classification Search
None
See application file for complete search history.

(56) References Cited

U.S. PATENT DOCUMENTS

| | | | | |
|---|---|---|---|---|
| 6,918,066 | B2* | 7/2005 | Dutta et al. | 714/46 |
| 8,805,094 | B2* | 8/2014 | Prasad et al. | 382/226 |
| 8,819,630 | B2* | 8/2014 | Chen et al. | 717/124 |
| 2004/0162874 | A1* | 8/2004 | Woo et al. | 709/203 |
| 2005/0177597 | A1* | 8/2005 | Elmer | 707/104.1 |
| 2010/0211893 | A1* | 8/2010 | Fanning et al. | 715/760 |
| 2011/0093773 | A1* | 4/2011 | Yee | 715/235 |
| 2011/0173589 | A1* | 7/2011 | Guttman | G06F 17/30873 717/125 |

OTHER PUBLICATIONS

Jin, Xin, et al., "A Maximum Entropy Web Recommendation System: Combining Collaborative and Content Features", Center for Web Intelligence, School of Computer Science, Telecommunication, and Information Systems, DePaul University, (Aug. 21-24, 2005), 6 pgs.

* cited by examiner

*Primary Examiner* — Asher Kells
(74) *Attorney, Agent, or Firm* — Shook, Hardy & Bacon L.L.P.

(57) ABSTRACT

Elements of the geometry of the image of a webpage as rendered on at least one target browser are compared with elements of a baseline geometry of the webpage to determine the differences between elements of the baseline geometry of the webpage and elements of the respective geometries of the image of the webpage as rendered on the at least one target browser. The elements of the image may be determined by a software tool for determining elements of a document geometry, such as a DOM geometry service. Code such as JavaScript may be injected into the webpage for use in determining the elements of the geometry of the image of the webpage. A list of issues that web developers face may be generated and the above differences between respective elements may allow arriving at a solution for at least some of the issues in order to provide testing of webpage information in real time.

17 Claims, 9 Drawing Sheets

REAL TIME WEB DEVELOPMENT TESTING AND REPORTING SYSTEM

FIELD

The present disclosure relates generally to real time testing of web development code.

BACKGROUND

As web developers using browsers iterate on their code (for example, HTML, CSS and JavaScript), it is becoming important to have an application that will run in the background in a passive way, checking and testing the code across desktop and device browsers.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
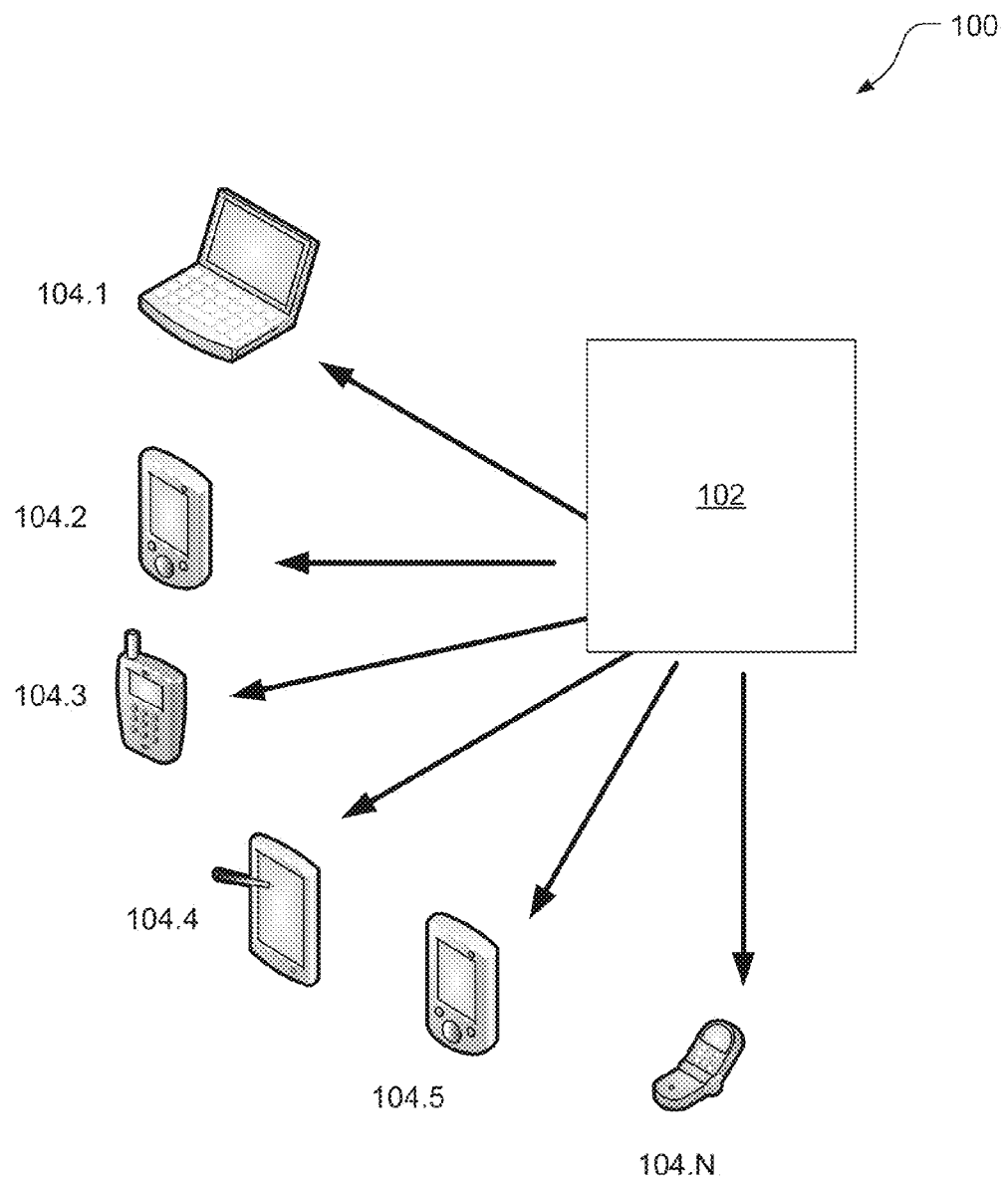
FIG. 1 is a diagram depicting a system for interfacing with computing devices, in accordance with an example embodiment.

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Disclosed herein is a real time web development code testing and reporting system. The system runs in the background and may include a Document Object Model (DOM) geometry service that provides a description of substantially all elements of a document when rendered by a target browser to arrive at document object model geometry of the document for that target browser. Generally, DOM is a standard way to expose information about the structure and contents of a document. A target browser is a web browser targeted for testing. The geometry of the document rendered at a "reference" (baseline) browser and the geometry of the document rendered at the target browser are compared for reporting differences between the geometry. The differences may include code issues. Stated another way, the system may read the web developer's source code and passes through a page under development and compares it with a particular set of rules and schemas, essentially determining whether the code is in compliance with certain requirements, for example United States or European Union compliance rules with respect to web pages, such as rules with respect to rendering for people who are visually impaired. If the code does not match a certain rule, an error is flagged. A system may implement this using a geometry service, sometimes referred to herein as a software tool for determining elements of a document geometry, or as a software tool for determining elements of the geometry of the image of a webpage as rendered on the at least one target browser. In some embodiments this may be a DOM geometry service. As an example, the system may send code, such as JavaScript, for a document through the rendering engines of many different target browsers of different types using a JavaScript Injection mechanism, to determine how each of those rendering engines renders that document. In other words, the system is "looking" at differences across those different rendering engines, seeking differences in how each rendering engine has produced the visual output for that document as respectively compared to a baseline browser, with the objective of allowing the developer to understand how the webpage under development renders on each browser type. This may be implemented by developing a list of common problems/issues that web developers face, determining which of the problems/issues exist in the code under test, and providing this valuable information in real time. In essence, this aims to make sure that web pages actually render with the proper intent. That is, the objective is to assure that web pages render in the way the author wants the pages to appear.

FIG. 1 is a diagram depicting a system for interfacing with computing devices, in accordance with an example embodiment. As depicted, the system 100 includes a computing device 102 that is in communication with multiple client computing devices 104.1, 104.2, ..., 104.N. As used herein, a "client computing device" refers to a computing device on a computer network that gains access to data files, programs, and other devices through another computing device, such as a server. Examples of client computing devices 104.N include desktop computers, mobile phones, laptops, tablet computers, personal digital assistants, and Set-top boxes (STB). In system 100, the computing device 102 functions as a hub that provides instructions and data to the client computing devices 104.

As an illustrative example, a Web developer who is designing Web pages using computing device 102 typically needs to interface with many different client computing devices 104.N because each type of client computing device 104.N and can receive data back from the device 104.N. can render the Web pages differently. The computing device 102 can transfer the Web pages or instructions to locate the Web pages (e.g., Uniform Resource Locator (URL)) to the client computing devices 104.N concurrently, and almost simultaneously.

Figure 2:
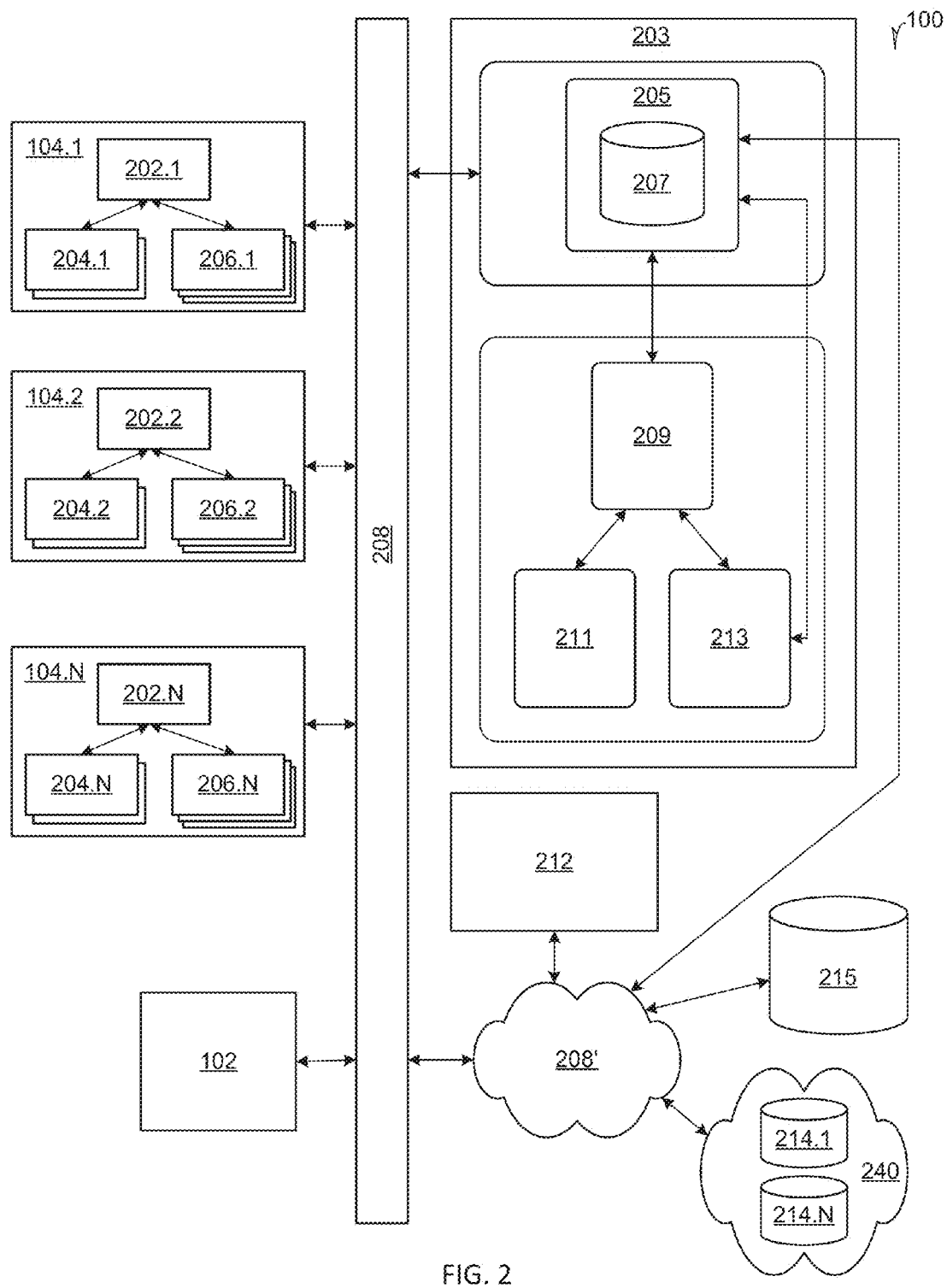
FIG. 2 is a block diagram depicting additional details of the system depicted in FIG. 1 for interfacing with computing devices, in accordance with an example embodiment.

FIG. 2 is a block diagram depicting additional details of the system 100 depicted in FIG. 1, in accordance with an example embodiment. As depicted in FIG. 2, the system 100 includes client computing devices 104.1, 104.2, ... 104.N, a computing device 102, a content server 212, and external storage devices 214.1 ... 214.N which may be located in the computer cloud. Those of ordinary skill in the art will understand that the external storage devices, or other devices disclosed as being in the cloud here, could also be in a server that is not in the cloud.

Also illustrated is connection database 215 which may be separate from or part of content server 212, and in connection relationship with the various devices discussed. Connection database 215 may store connection records such as UUID; device details for the various devices in the system, which may include device name and model number, version, telephone and carrier details, hardware status, and the like; account information, such as email account address and information; desktop details; and connection history such as network ID, IP address 1, IP address 2, etc. Various components of the system 100 are in communication by way of one or more computer networks, such as wireless computer network 208 and Internet 208', which is a global system of interconnected computer networks. In this example, the client computing devices 104.N are in communication with the computing device 102 by way of a wireless computer network 208, but it should be appreciated that communication can also be by way of a wired computer network. Similarly, the client computing devices 104.N and computing device 102 are in communication with content server 212 and external storage devices 214.N by way of the Internet 208'.

Content server 212 may be a stand-alone device in which electronic documents with any content can be stored. A Web server is an example of a content server 212. Each client computing device 104.N includes a test and report application device client module. One example for this may be the Adobe® Shadow Device Client™ available from Adobe Systems, Inc. The client module may receive receiving and respond to requests from computing device 102. Each client computing device 104.N also includes, one or more Web browsers 204.1, 204.2, ... 204.N, and other content viewers 206.1, 206.2, ... 206.N that display or render content provided by either the computing device 102 or the content server 212.

The computing device 102 of FIG. 1 is illustrated in FIG. 2 as a desktop 203 that includes a real time test and report device manager 205 (that may include a local connection database 207), a test and report application user interface 209, desktop browser 211, and web content authoring tool 213. The test and report application user interface 209 is connected to the test and report application device manager 205, to the desktop browser 211, and to the web content authoring tool 213. Web content authoring tool 213 is connected to test and report device manager 205. The desktop 203 may be connected to the other components of the system 100 by way of Internet 208' which connection may be wireless (208) or otherwise. The computing device 102 can push content to each client computing device 104.N for display on its browser 204.N or content viewer 206.N, Examples of content that may be communicated to the client computing devices 104.N includes Web pages, document files, image files, asset files created by graphics editing programs for previewing, video files, and other files and data. Additionally, the content server 212 can also provide content to the client computing devices 104.N.

Each external storage device 214.N is separate from the computing devices 102 and 104.N. The external storage device 214.N provides addressable data storage for the computing devices 102 and 104.N, the data storage of which is not currently in the computing devices 102 and 104.N main storage or memory. Examples of external storage devices 214.N include hard drives, flash memories, solid-state drives (SSDs), and tape storage. In one embodiment, the storage devices 214.N can be located in a cloud computing environment 240. As discussed briefly above, cloud computing is a model for enabling on-demand network access to a shared pool of configurable computing resources (e.g., networks, servers, storage, applications, and services) that can be provisioned and released with minimal management effort or service provider interaction. The cloud computing environment 240 can include applications and enterprise services. The applications running on the cloud infrastructure are accessible from various client platforms (e.g., client computing devices 104.N) through thin client interfaces, such as Web browsers 204. In the cloud computing environment 240, each application relies on one or more enterprise services, which refer to the underlying structure supporting communications among units of work (also referred to as services) executed on behalf of the applications. The services provided by the enterprise applications are pooled to serve multiple applications and client platforms with different physical and virtual resources dynamically assigned and reassigned according to user demand.

Still referring to FIG. 2, the computing devices 102 and 104.N can store inventories of the computing devices 102 and 104.N on one or more external storage devices 214.N. Such an inventory can be used to reconnect the computing devices 102 and 104.N in the event of a connection failure.

Figure 3:
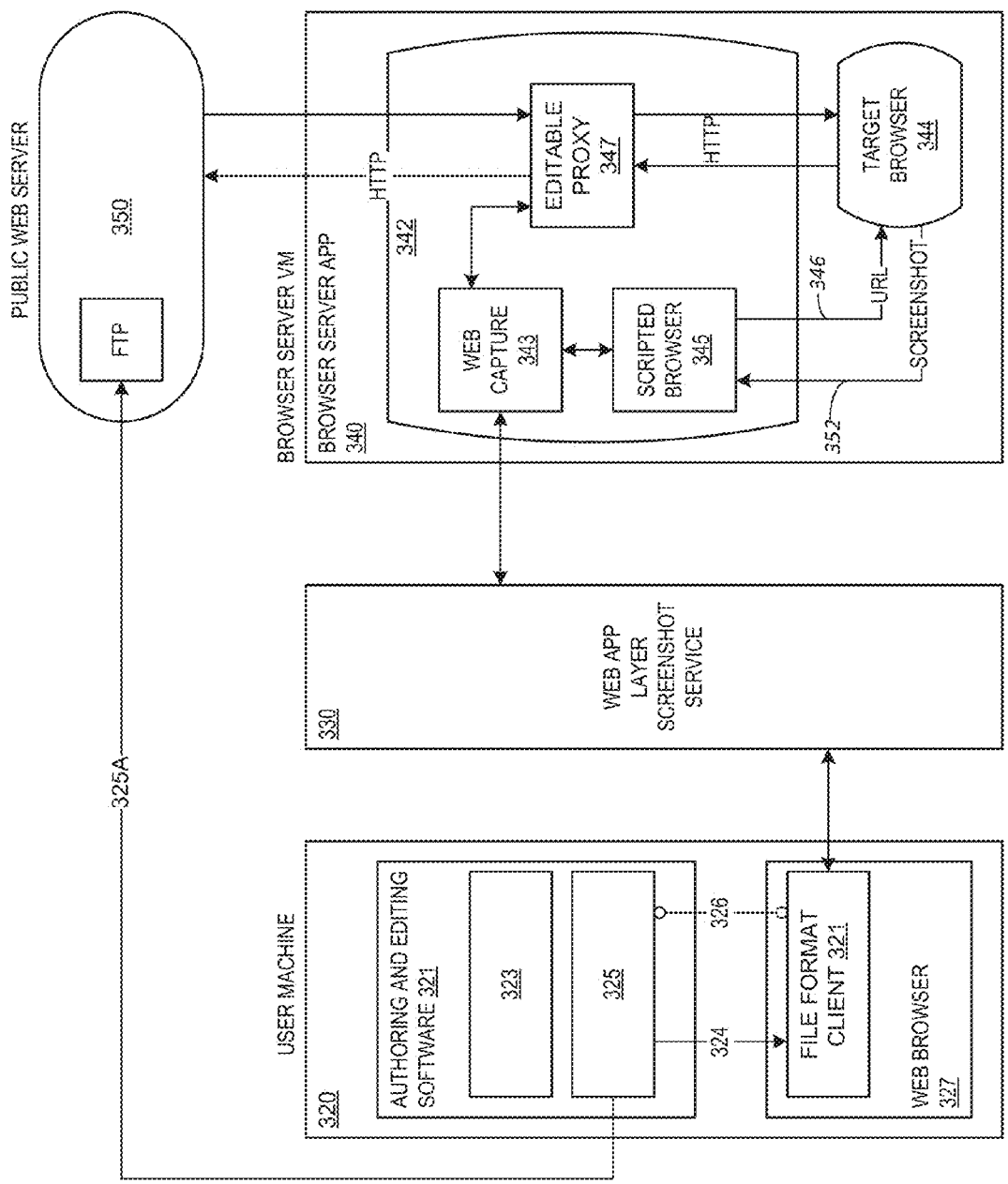
FIG. 3 is an illustration of another representation of the system including further detail of certain hardware components useful in an example embodiment.

FIG. 3 is another representation of the system including further detail of certain hardware components useful in an example embodiment. In FIG. 3, user machine 320 represents desktop 203 of FIG. 2 in more detail. User machine 320 may include authoring and editing software such as Adobe Dreamweaver™ that may provide both visual and code-level capabilities for creating standards-based websites and designs for the desktop, smart phones, tablets, and other devices. The industry standard for this type of software is Dreamweaver™ available from Adobe Systems, Inc. Software 321 may include editor and related files 323. Software 321 may also include a cross-browser testing software 325 creative suite extension. The creative suite used may be Creative Suite 5.5 available from Adobe Systems, Inc., for developing rich interactive apps for mobile devices such as Android™, Blackberry®, and iOS™ mobile operating systems. Creative Suite 5.5 will allow the development of browser content with HTML5 tools. Referring back to cross browser testing software 325, this software will allow a developer to plug in a URL, the extension then allowing the system to render that page on a server farm, which may include many browsers of different types, and show the user the results. A system that may be used for this purpose is BrowserLab™ which is also available from Adobe Systems, Inc.

User machine 320 also includes web browser 327. Web browser 327 may include file format client 328 for multimedia, vector graphics and the like. The leading format for this use, which allows animated vector graphics and other functions, is Adobe System's SWF™ which may be obtained as part of the Adobe Systems Flash® file format including Action Script™ for a client format with adobe BrowserLab.

Software 325 and file format client 328 are coupled together, in one embodiment, by local connection 326 and by connection 324 for digitally created background patterns and effects, often referred to as GAK. Software 325 is also connected to public web server 350 over line 325A using FTP, or some other appropriate protocol, for providing persistent updating.

Item 340 is a browser server which may be a virtual machine. There may be one or more browser server virtual machines in the system. In operation the browser servers run specific instances of particular browsers and uses introspection of the DOM when or as a requested or provided screenshot is rendered on the browser and sends the geometry model and the screen shot and the browser identification information back to user machine 320. The user machine 320 may take that information and make the comparisons and perform the error reporting. One of ordinary skill in the art will recognize that in other embodiments the comparison could be performed in the browser server or other comparison hardware.

The browser server 340 includes browser server app 342 that may include web capture 343, scripted browser 345 and editable proxy 347. An editable proxy is a service that intercepts network traffic to and from the target browser. Web capture 343 is a structure used to keep track of information related to an individual capture request. Editable proxy 347 is coupled to target browser 344 which is the browser whose instance is run by the browser server. Target browser 344 sends requests to, and receives responses from, Editable proxy 347. For example, target browser 344 may make requests of editable proxy 347 for resources for the page to be rendered which editable proxy 347, connected to public web server 350, may obtain from the public web server. Editable proxy 344 may also inject into the target browser JavaScript code for DOM introspection for use by the JavaScript engine inside the browser. Item 330 is a web app layer screen shot service. This service may be located in the cloud. A web application is generally accepted to be an application which is built using the core internet technologies of HTML, CSS, JavaScript and HTTP. The general paradigm is that a component runs on a mobile device (or a web browser or a native application) and communicates with server components running "in the cloud." Web apps can also run in an offline mode which means they are still usable if there is no Internet access. So in general a web app runs on the mobile device but communicates with the cloud at some point for some part of the functionality. This is similar to an email client running on a mobile device. The user can read emails that have been downloaded and respond/create new emails even if the device is off the network (e.g., in airplane mode), but new emails can be received or sent only when the device is online.

Figure 4:
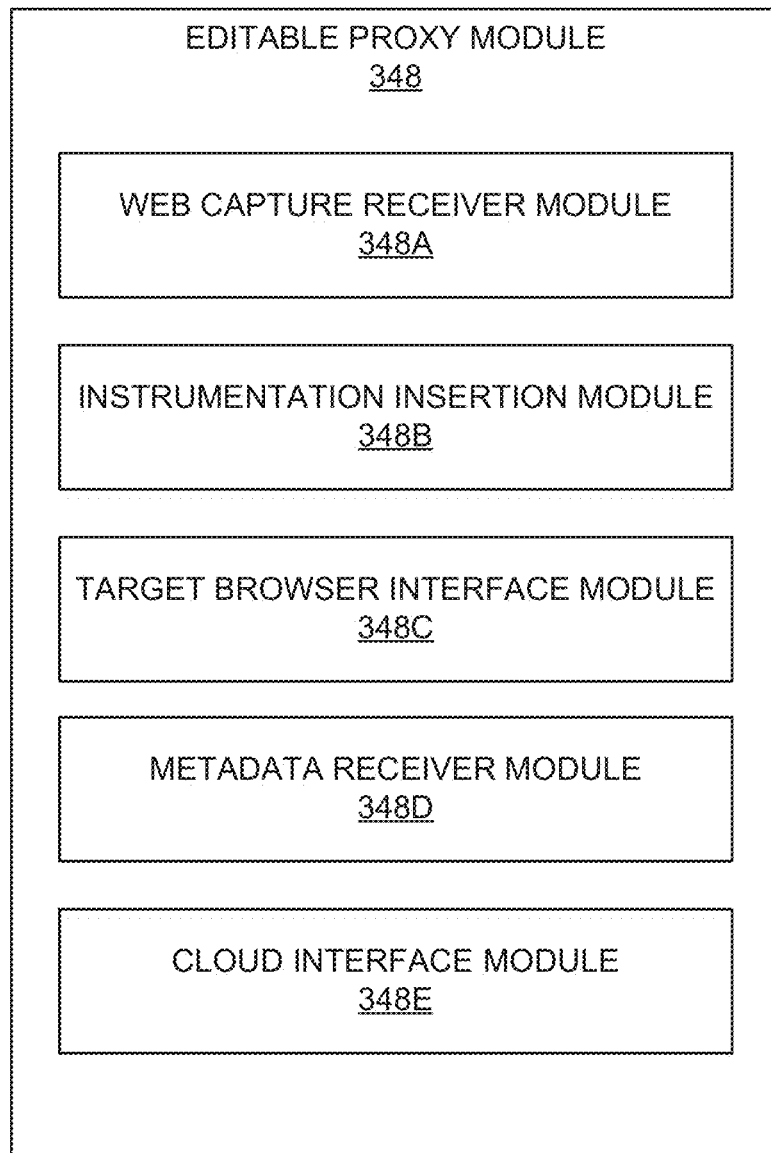
FIG. 4 is a block diagram of editable proxy module, in accordance with an example embodiment, that may be included in the system depicted in FIG. 3.

Turning now to FIG. 4, there is seen a block diagram of editable proxy module 348 of FIG. 3 that may be resident in or with respect to editable proxy 347 of FIG. 3. Editable proxy module 348 comprises web capture receiver module 348A, instrumentation insertion module 348B, target browser interface module 348C, and metadata receiver module 348D. "Instrumentation" may be considered to be the parameters of the web page that are to be measured by the DOM geometry service.

Web capture receiver module 348A receives requests from a user machine such 203 of FIG. 2, an example of which is seen at 320 of FIG. 3. The request may be sent via web app layer screenshot service 330 of FIG. 3. The request may include a URL. Web capture module 348A retrieves the web page using the URL. This is an optional action. Content may also be retrieved from elsewhere. For example, a standard URL could be issued pointing to public server 350, but the method could provide for a URL that requests retrieval of the document or web page via a local tunnel.

Instrumentation insertion module 348B imports instrumentation, into the web page obtained by way of web capture 343. Target browser interface module 348C receives the web page and transmits it to the target browser 344. The target browser 344 will use the web page and the instrumentation information discussed above for DOM introspection discussed above to determine the geometry of the web page for comparison with rules and schema as discussed above and in more detail below. Metadata receiver module 348D receives measured instrumentation, sometimes referred to herein as metadata generated from the scripted browser 345, and forwards it to the web capture 343 for transmission to the client machine for the comparison function.

The cloud interface module 348E is configured to interface with a cloud computing environment. As discussed briefly above, the editable proxy server module 347 can interface with the cloud computing environment by way of the cloud interface module 348E to store inventories on or retrieve inventories from external storage devices. Elements of the geometry of the image of a webpage rendered on target browser 244 can be transmitted by way of the cloud interface module 348E.

Figure 5:
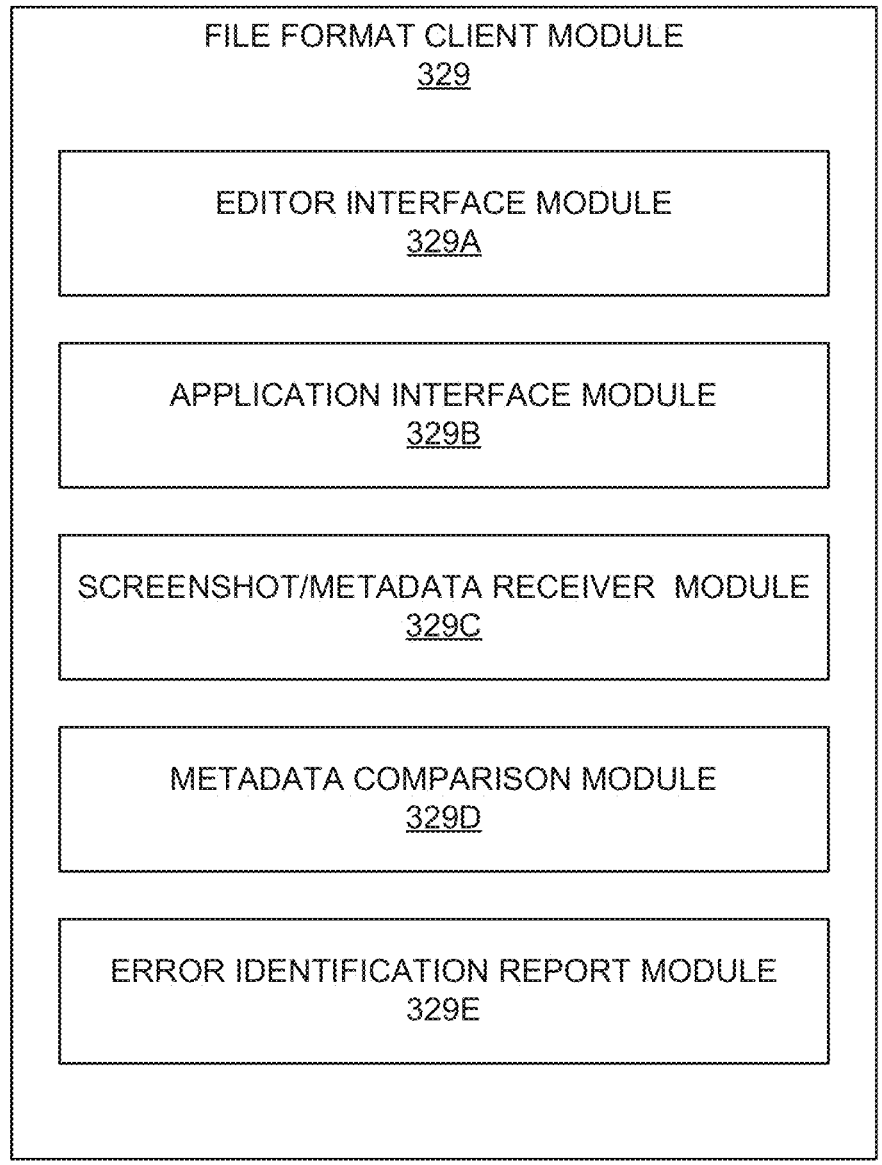
FIG. 5 is a block diagram of a file format client module, in accordance with an example embodiment, that may be included in or with the system depicted in FIG. 3.

FIG. 5 illustrates a block diagram of a file format client module 328, the block diagram seen as file format client module 329. File format client module 329 comprises editor interface module 329A, application interface module 329B, Screen shot/metadata receiver module 329C, metadata comparison module 329D and error identification and report module 329E.

Editor interface module 329A interfaces with editor and related files 323 of FIG. 3 to receive a URL or local document source and information regarding the set of browsers the document is to be rendered on for DOM introspection to arrive at the DOM geometry of the document as rendered on the specified browser or browsers. Arriving at the DOM geometry is done at the target browsers 344 using the JavaScript code injected into document or webpage into the target browser 344, in one embodiment, by the editable proxy 347. Application interface module 329B transmits requests comprising the URL (or local document source) and the set of browsers on which the document or webpage is to be rendered, to web app 330. The request could be made each time the web page is saved, or by some other defined frequency. In response, the application interface module 329B receives a set of screenshots and a set of document metadata associated with the screen shot. Screen shot/metadata receiver module 329C receives a designation of reference metadata. Metadata comparison module 329D then compares the set of metadata generated by the DOM geometry service to the reference metadata. This may involve comparison of positions of the objects, object sizes, layout and overlap. Error identification and report module 329E may then identify errors based on the comparison, with respect to a threshold or tolerance level if desired, and sends the user a report including code issues and prospective resolutions.

A DOM geometry service may perform the features next above for multiple target browsers that are specified by the web developer. This may be done concurrently. The system will respectively compare each geometry against a baseline and list the differences by target browser in an easy to consume report. This may be implemented by developing a list of common problems/issues that web developers face, and arriving at a solution for at least some of them in order to provide valuable testing information in real time. The list of issues may include the following:

JavaScript Errors and debugging statements
Single DOM Observations (obscured/overlapping elements)
Multiple DOM Comparisons/Differences (DOM Geometry)
Use of unsupported HTML and CSS features
records actions in browsers
CSS Validation
CSS3 vendor specific rule balancing CSS Lint (syntax checking)
HTML/HTML5 Validation
Accessibility Validation
Spell Checking
Link Checking
Page Load time, size and profiling information
Large images that would benefit from optimization or compression The differences reported by the error identification report module 329E may include
  position and size of elements
  Z-order differences
  box model differences
  font differences Such a DOM geometry application may oversee a developer's code while he or she tests the code. This may be viewed as validating the webpage against various checks and is sometimes called "preflighting" a webpage. It may also add or remove target browsers from the list of targets to test. As one example, in the Adobe BrowserLab user interface, there is a "Bro-syserSets" wherein the user can uncheck the browser. As the developer loads pages, clicks links, and interacts with a page, the application may perform the same options in the background on the target browsers. Such an application may analyze the DOM and content for differences and problems, and provide a running real time list of issues that need to be addressed. This would allow the user to set the thresholds for the various types of tests, to help refine the issues and set tolerances to avoid over-reporting issues. For example, the user may allow a tolerance of, say, five percent (5%) for size or spacing issues, or other issues, and the application would not report such issues it finds below that tolerance. For example, if an element is off by, for example, three pixels, that might be acceptable if three pixels is within the five percent. But if the element is off by five or six pixels, and that puts it beyond the five percent, then the element will be flagged as an error in a report sent to the web developer. When visible differences are found, the application may provide a screenshot image of that (problem so that the user can see the issue to help make a decision whether or not to act on the problem. For example the report may be designed such that when the developer clicks on a listed problem in the report the element that the problem refers to is highlighted on that particular view. That element may be highlighted with a red border around that element. Some visual around that element may be observed on the screen when the web developer clicks on the report. In one embodiment when the web developer clicks on each line item error in the report the corresponding element on the view is highlighted. This may be used to give the web developer a visual list of the errors. In another embodiment the image as coded may be rendered next to an image with the errors highlighted, in side by side relationship for easier viewing. The application may also allow the user to increase the allowed tolerance of issues, or signal that something is a false positive.

The DOM geometry may be generated by JavaScript injection into target browser 344 as described in more detail below. The DOM geometry may be generated from the Browser rendering and, by comparison of where and how the different rendered objects appear on a page, performed at the user machine 320 as explained, can, depending on threshold settings, trigger errors to be reported. System code performs introspection of the DOM looking for issues.

The DOM geometry adds document layout and geometry information of essentially all elements of the screenshots generated by browsers hosted on one or more browser servers in the system.

DOM Geometry

The DOM geometry service then adds information about the location and size of each HTML element to the screenshot information. This location and size information may be generated in the target browser(s) 344 and posted back to the Editable Proxy 347 which attaches it to the metadata of the content at WebCapture 343 of FIG. 3. The DOM Geometry Service essentially extends existing functionality of Editable Proxy 347 to add the DOM geometry. When the response for the main page is received by the Editable Proxy 347 a JavaScript program may be injected into the HTML in the target browser 344 using that browser's JavaScript engine. This program obtains the browser specific geometry for the page and posts it, in one embodiment, to a specially constructed URL. The Editable Proxy 347 intercepts the post and attaches the geometry information to the other metadata for the screenshot held in the WebCapture 343. The screenshot metadata may be picked up by the web app layer Screenshot Service 330 and sent to the file format client 328.

Generating DOM Geometry

JavaScript running in each target browser may be used to query the current page DOM and record the location and size of each element. The basic functionality of the JavaScript is to "walk" the DOM and for substantially all of the elements to perform the following functions:
  generate a unique identifier
  calculate the position and size
  determine if the element is a link and record the href attribute
  write the information for each element to an XML document After the entire DOM tree is traversed the XML document may be serialized and posted back to the Editable Proxy server 347.

Unique Element Identifier

Each element may have a unique identifier so that the same elements can be compared across different target browser types. The unique identifiers are generated from various properties of the HTML in such a way that they are both unique and meaningful to the page author. If an "ID" attribute is present in the HTML it may be desired that it be guaranteed to be unique and therefore that it will be meaningful to the user, so it could be used as the identifier. If there is not an ID, but one or more classes are used then the identifier should be constructed from the class names since class names provide semantic meaning to an element. For example, if only one class applies to a DIV element then if it is the first element using the class galleryItem then the ID may be "DIV.galleryItem-0". The next element using galleryItem is "DIV.gallery-item-1", and so on.

If more than one class applies to an element then the ID may be formed from the concatenation of the class names as represented in the className property. For example, if the fat-border and small-box classes are defined for the first element in a table the ID may be "TD.fat-border.small-box-0". If there is no ID and no className then an ID will be generated based on the tagName. For example, P-0, P-1, etc.

Calculating Position and Size

Getting the size of an element may be supported in the target browsers through the DOM Element.offsetHeight and offsetWidth. Getting the position is not as simple. Different browsers offer different levels of support for calculating element positions. BrowserLab™ available from Adobe Systems, Inc. may be used as follows. Browserlab is an online service that allows web professionals to test both publicly viewable and private web pages. Screenshots of actual browser renderings are generated in real time, with multiple viewing options and diagnostic tools to help discover cross-browser compatibility issues. Adobe Dreamweaver® CS5 and CS5.5 software has features to enhance the experience of using BrowserLab. The JQuery library offers a single method, offset, which works for the browsers supported by Browser-Lab, so this method may be used.

The full set of CSS box model parameters are calculated—padding, border and margin. For most browsers document-.defaultView.getComputedStyle returns the required information. For IE getComputedStyle is not available so other strategies are employed.

Geometry XML Document

The geometry is captured in an XML document that mirrors the HTML document structure. As the HTML DOM is traversed, for each node processed a corresponding node is created in the geometry XML. An example geometry XML is given below.

```
<BODY uniqID="BODY.thrColLiqHdr-0" top="0" left="0" height="656" width="886">
    <DIV uniqID="DIV#header-0" top="0" left="134" height="97" width="797">
        <H1 uniqID="H1-0" top="0" left="144" height="42" width="777" />
        <H3 uniqID="H3-0" top="56" left="144" height="15" width="777" />
        <DIV uniqID="DIV.breadcrumb-0" top="85" left="144" height="12" width="777">
            <A uniqID="A-0" top="85" left="144" height="13" width="93"
            href="http://dreamweaver.macromedia.com/MeerMeer/index.html" />
            <A uniqID="A-1" top="85" left="258" height="13" width="80"
            href="http://dreamweaver.macromedia.com/MeerMeer/best_practices.html#" />
        </DIV>
    </DIV>
</BODY>
```

This format may be considered verbose and if the document structure is complex the resulting size may be large. The web app server 330 will compress the response if the request includes a header that allows compression-Accept-Encoding: gzip, deflate.

Posting Geometry XML

The geometry XML document may be sent back to the Editable Proxy 347 by posting the XML as form data. To avoid security issues the post may be sent to the same host as the page being previewed. The URL specified in the post request contains special identifiers that are noticed by the Editable Proxy 347 and allow it to attach the posted data to the correct WebCapture, including metadata such as instrumented DOM.

Avoiding JavaScript Conflicts

Since many web pages use JavaScript there may be the possibility that other scripts may interfere with the DOM geometry script. There are a number of things that can be done to minimize the risk of interference.

the DOM geometry script is wrapped in an anonymous function that is executed before other JavaScript.
  the DOM geometry script uses a BrowserLab specific reference to JQuery Injecting DOM Geometry JavaScript The process of injecting the DOM geometry JavaScript may be done in the EditableProxyRequest, or in WebCapture.respondFromCachedTunnel if content is being tunneled. When a response for the primary content being tested is seen and DOM geometry is requested then the JavaScript code for generating geometry metadata may be injected. In one embodiment the response may be compressed and/or chunked, so it must be parsed by the proxy 347 before injection is done.

The proxy 347 may read the response, un-chunk and uncompress it if it was compressed. Then the content can be parsed to find an appropriate spot to inject the code, the code may then be injected and the response rewritten. The response sent back to the target browser 344 of FIG. 3 will not be chunked or compressed since incremental display and bandwidth are not relevant in the browser server environment.

in one embodiment, a proxy is forbidden from modifying the following headers: Allow, Cache-Control, Content-Location, Content-MD5, ETag, or Last-Modified, Expires. Content-Encoding, Content-Type and Content-Range cannot be changed if no-transform Cache-Control is requested. Content-Encoding may be changed by a proxy as long as no-transform is not specified. If any of these rules must be violated to inject the code then an error will be returned in the screenshot metadata, indicating that the DOM geometry could not be returned.

Filtering Out JavaScript

BrowserLab can also operate in a mode where JavaScript is disabled. This is done to "freeze" the state of a page being previewed. To generate the DOM geometry when JavaScript is disabled the browser server removes existing JavaScript from the page and then injects just the JavaScript that generates the DOM geometry. An HTML parser may be invoked on HTML requested for the screenshot. The parsed HTML may be filtered to remove elements with "script" and "jscript" tags. In addition, attributes that contain intrinsic event handlers are also removed. This covers the cases where JavaScript code might be directly included in attributes like onClick="javasctipt:btnPressed( );".

Figure 6A:
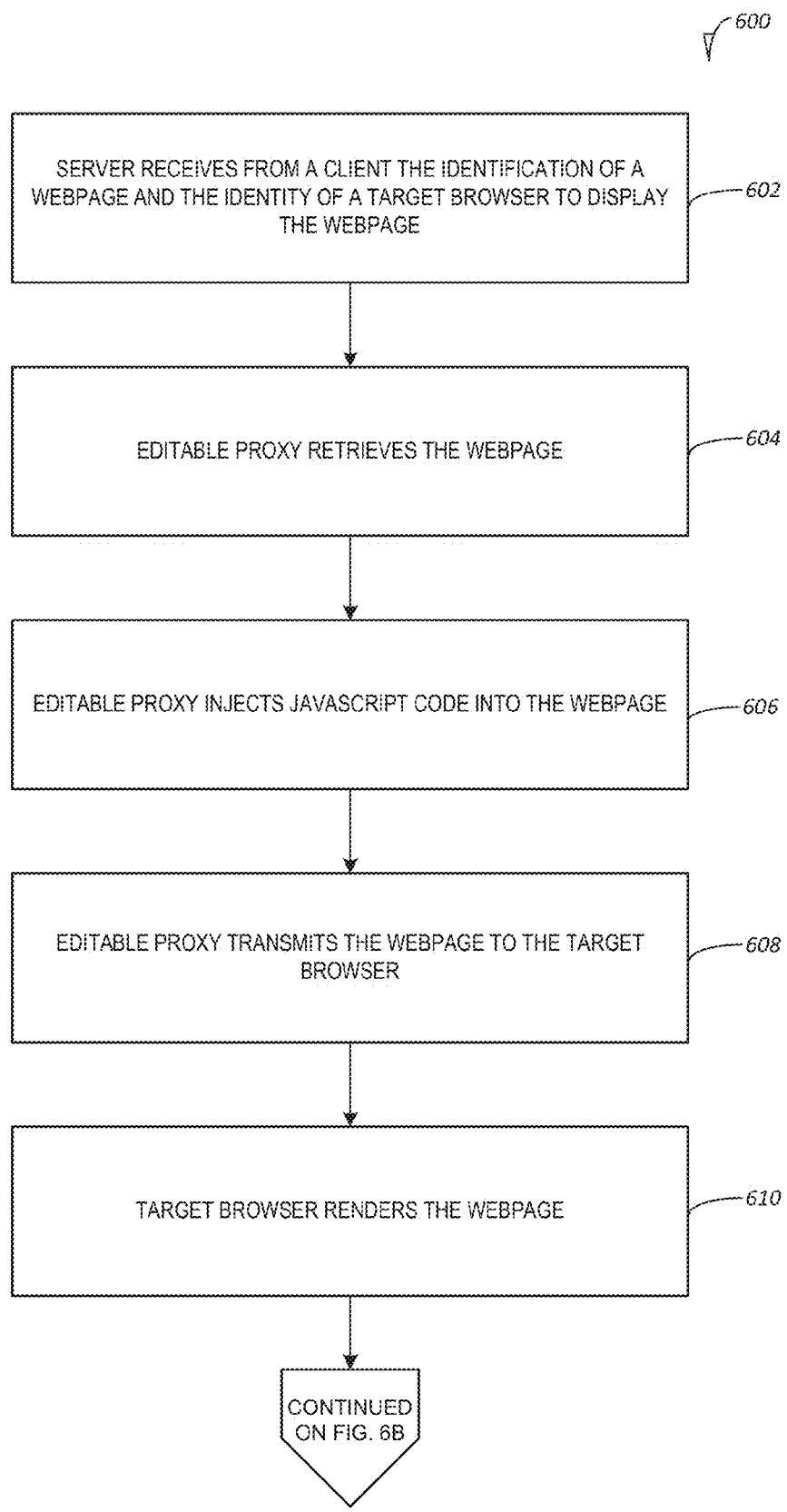
FIG. 6A depicts a flow diagram of a method performed by a computing device, such as the computing device depicted in FIG. 3, for real time test and reporting fir web development, in accordance with an example embodiment.

An example of operation of an embodiment is seen in flow chart format in FIG. 6. Those of ordinary skill in the art will readily recognize that this example is only one of many examples of embodiments. Operation 600 may begin at 602 where browser server 340 of FIG. 3 receives a request for a web page and the identity of the target browser on which to render the webpage. The request may be made front client 321 by way of web app 330 of FIG. 3 to web capture 343, and the request may then go to the target browser 344 by way of scripted browser 345. Only one targeted browser is illustrated for ease of illustration but those of ordinary skill in the art will recognize that there may be several targeted browsers. The webpage to be rendered may be requested by URL which may then be transmitted to the target browser(s) 344 by scripted browser 345 which may then transmit the URL to the targeted browser via line 346.

At 604 the targeted browser 344 of FIG. 3 may request the webpages by way of editable proxy 347 via a local tunnel, and the editable proxy 347 may retrieve the webpage from public web server 350 using HTTP and transmit the webpage back for rendering on the target browser 344.

At 606 the editable proxy 347 may inject code into the web page. The code may be JavaScript used to generate DOM geometry. For example, the normal JavaScript API allows DOM introspection by finding elements of a current page and information about the page geometry.

At 608 the editable proxy 347 of FIG. 3 may transmit the webpage for rendering at the target browsers 344. At 610 the target browser 344 of FIG. 3 may render the webpage.

At 612 the JavaScript engine of the target browser may execute the JavaScript code and may use a DOM geometry service to generate the DOM geometry with the code that was injected by editable proxy 347. The DOM geometry may be a unique page identifier in an XML document, which may be generated by the JavaScript engine in the target browser 344.

At 614 the target browser 344 of FIG. 3 may transmit elements of the geometry of the image of the webpage rendered on the target browser to a web interface at web capture 343 via scripted browser 345.

At 616 the server may transmit elements of the geometry of the image of the rendered webpage to the client on line 354 via the interface at web capture 343. The elements of the DOM geometry may be returned to the file format client 321 via web app 330 of FIG. 3.

At 618 the client 321 may compare the returned elements of the DOM geometry of the image of the webpage as rendered to the DOM geometry of a baseline geometry of the webpage to determine errors in the webpage as rendered at the target browser 344. If some of the elements of the DOM geometry of the webpage rendered at the target browser are out of tolerance, which could be expressed in a number of pixels for such elements as margin error or other errors, an error may be indicated. That is, if there is no match within the tolerance of a particular rule, then that rule may be flagged as an error with respect to the rendering of the webpage by the target browser.

Figure 7:
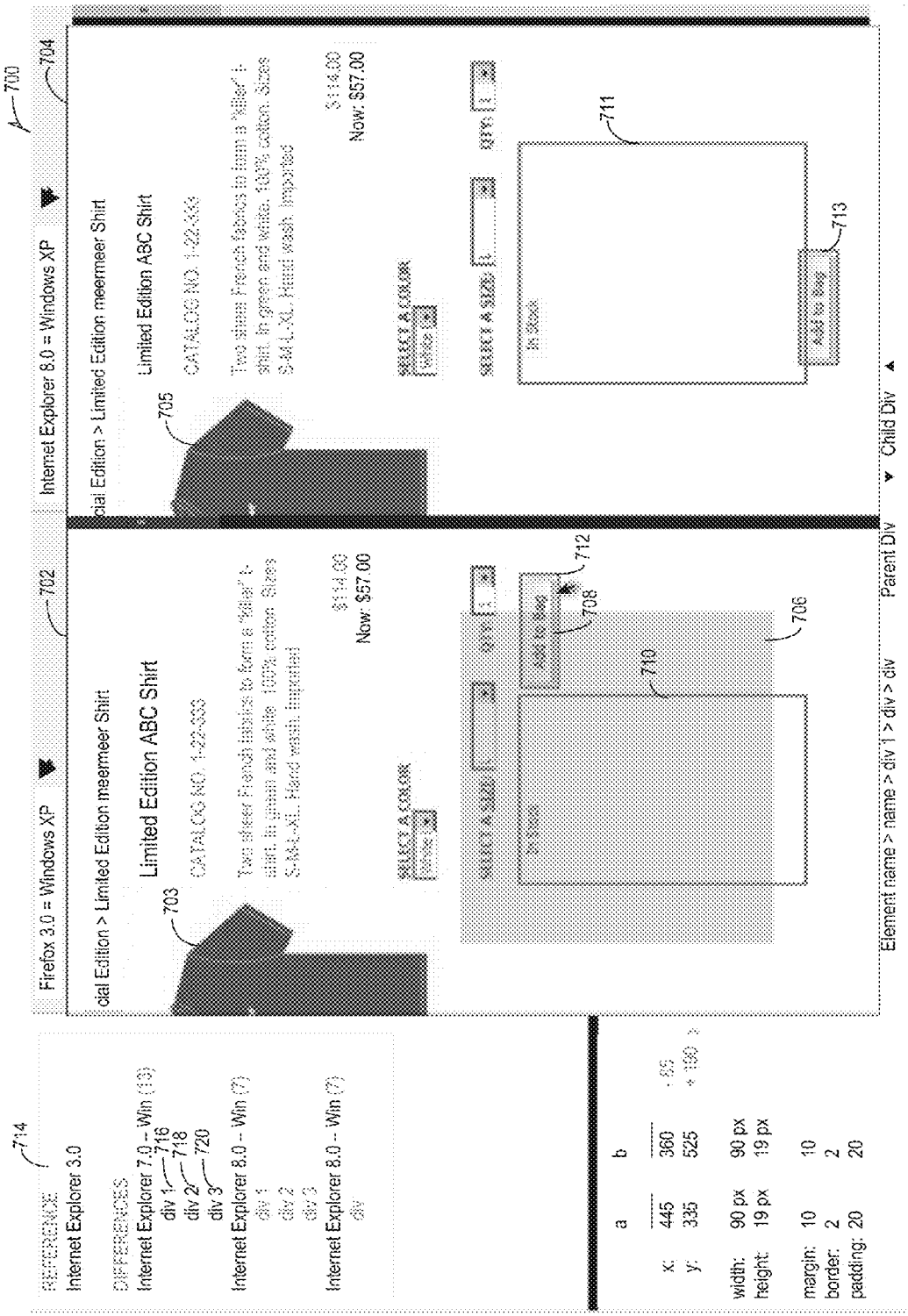
FIG. 7 depicts a screen shot that may be used in one embodiment.

FIG. 7 depicts a screen shot 700 of how rendering the differences at a client as discussed above may be implemented in accordance with an embodiment. Seen in FIG. 7 are a webpage rendered on a reference browser 702 and the webpage rendered on a target browser 704. The user selects the two browsers that he or she or wants to compare, and which is the reference browser and which is the target browser. In this embodiment the reference browser 702 is Firefox 3.0 running on Windows XP and the target browser 704 is Internet Explorer 8.0 running on Windows XP. Using the elements of the web pages returned by DOM, as one example, for each of these browsers the co-ordinates of the displayed elements are compared, and where there is a difference, that difference is highlighted. As an explanatory note, shirts 703, 705 are partly off screen merely because of lack of display real estate in this embodiment. Scroll bars would enable a user to pan to see that part of the shirts that are cut off.

In this embodiment the above differences are highlighted in two ways. The first is graphical. Boxes 706, 708 are around the "In Stock" and the "Add to Bag," indicating that they are respectively different in positions/sizes in the displayed areas of the two browsers 702, 704. A difference in size on the two renderings can be seen by comparing the sizes of In Stock 710 on browser 702 and In Stock 711 on browser 704. A difference in position on the two renderings can be seen by visually comparing Add to Bag 712 on browser 702 with Add to Bag 713 on browser 704.

The second way differences may be highlighted is seen at panel 714 on the left of FIG. 7 where the graphical items ("div") 716, 718 and 720 are highlighted. Expanding the "div" 716, 718, 720 indicators would detail out the particular pixel co-ordinates and dimension of each of the graphical objects given the viewer, who may be a web developer, insight into how to adjust the webpage for the target browser.

Figure 6B:
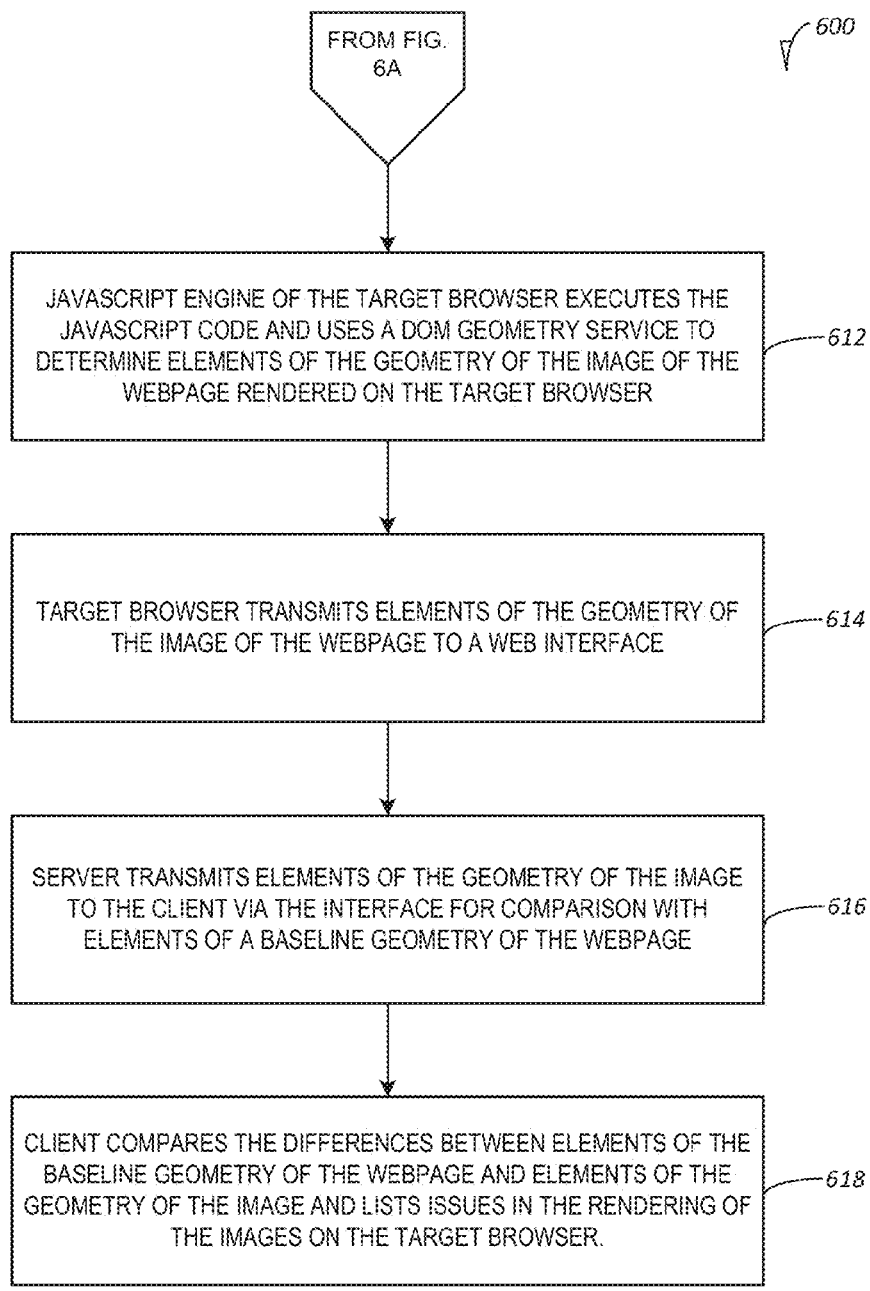
FIG. 6B is a continuation of the flow diagram of FIG. 6A.

Not shown in FIG. 7 is the comparison described in FIG. 6B. That is, the system may return an image, for example, as a JPEG file, of the screen as rendered by the reference browser on a backend for comparison to a reference as discussed above. One browser is selected as the reference browser and then other browsers are compared against the reference browser. As explained above, the left image 702 is the reference browser (Firefox) and the right browser (Internet Explorer) is compared against that. The term "reference browser" may be used in the context that the browser on the left, 702, is not necessarily correct in its rendering of the webpage, although it may be. It may be just a point of comparison with other browsers and the web developer is looking for differences. It is up to the user to determine which browser is correct and adjust their CSS/HTML/Javascript accordingly.

Figure 8:
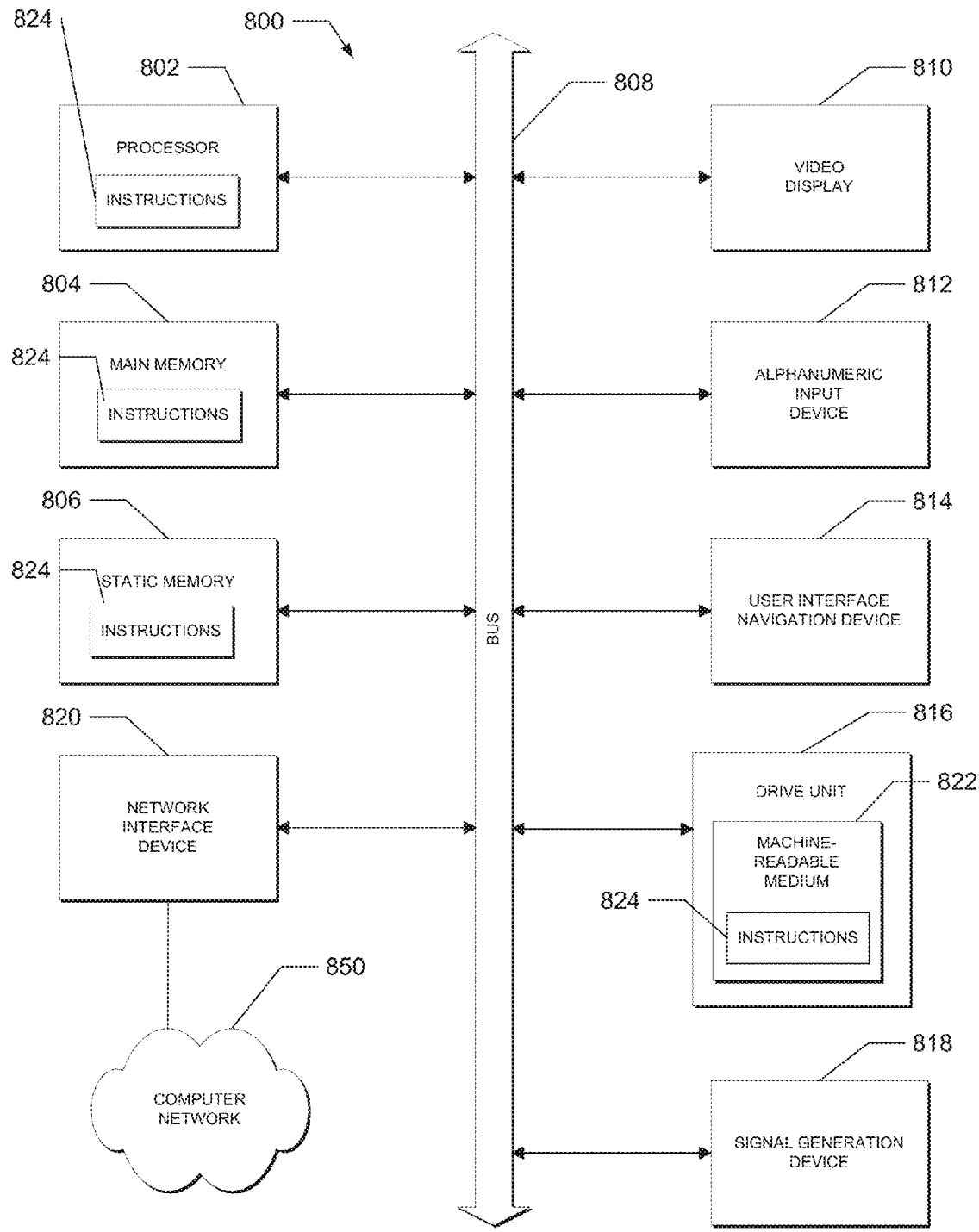
FIG. 8 depicts a block diagram of a machine in the example form of a computing device within which may be executed a set of instructions for causing the machine to perform any one or more of the methodologies discussed herein.

FIG. 8 depicts a block diagram of a machine in the example form of a computing device 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 800 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The computing device 800 may further include video display unit 810 (e.g., a plasma display, a liquid crystal display (LCD), a touch screen, or a cathode ray tube (CRT)). The computing device 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically, or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques autoconnection of computing devices may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
   at a server, receiving a request comprising an identification of a webpage and at least one target browser on which the webpage is to be rendered;
   in response to the request, retrieving the webpage and injecting code into the webpage, wherein the injected code is used by the at least one target browser to determine elements of a geometry of an image of the webpage rendered on the at least one target browser;
   determining the elements of the geometry of the image of the webpage rendered on the at least one target browser, wherein the elements of the geometry of the image of the webpage rendered on the at least one target browser are determined by the at least one target browser based on the injected code, and wherein the elements of the geometry of the image of the webpage rendered on the at least one target browser are determined in real time as a user input is received at a client machine, the user input comprising a user interaction with the webpage at the client machine and causing the server to perform a corresponding operation at the at least one target browser, the corresponding operation altering the elements of the geometry of the image of the webpage rendered on the at least one target browser; and communicating, from the server to the client machine, the elements of the geometry of the image of the webpage rendered on the at least one target browser for comparison with elements of a baseline geometry of the webpage to determine differences between the elements of the baseline geometry of the webpage and the elements of the geometry of the image of the webpage rendered on the at least one target browser, wherein the comparison is performed by an application executing at the client machine, wherein the determined differences are presented by the client machine in real time as the user input is received, wherein the application executing at the client machine generates a report including a list of errors associated with the image of the webpage rendered on the at least one target browser, and wherein the application executing at the client machine is configured to receive an indication that a first error from the list of errors is a false positive.

2. The method of claim 1, wherein the injected code comprises a scripting language and is injected by an editable proxy module.

3. The method of claim 1, wherein the at least one target browser comprises a plurality of browsers, at least some of which are of different types.

4. The method of claim 3, wherein the elements of the geometry of the image of the webpage rendered on the at least one target browser are provided by a software tool for determining elements of a document geometry, and wherein the determining is performed as a background process in real time as the user input is received.

5. The method of claim 4, wherein the software tool performs at least one of the following: generating a unique identifier, calculating a position and a size of an element, determining if an element is a link and recording an associated href attribute, or writing information for each element to an XML document.

6. The method of claim 1, wherein in response to a selection of a second error from the list of errors, the application executing at the client machine provides a visual indication of a portion of the image of the webpage that is associated with the selected error.

7. A non-transitory machine-readable storage device having embedded therein a set of instructions, which, when executed by a server, causes execution of the following operations:
providing a webpage for rendering on at least one target browser, wherein the webpage is injected with code that is used by the at least one target browser to determine elements of a geometry of an image of the webpage as rendered on the at least one target browser;
determining the elements of the geometry of the image of the webpage as rendered on the at least one target browser, wherein the elements of the geometry of the image of the webpage as rendered on the at least one target browser are determined by the at least one target browser based on the injected code, and wherein the elements of the geometry of the image of the webpage as rendered on the at least one target browser are determined in real time as a user input comprising a user interaction with the webpage at a client machine is received, the user input causing a corresponding operation to be performed by the server at the at least one target browser; and
communicating the elements of the geometry of the image of the webpage as rendered on the at least one target browser for comparison with elements of a baseline geometry of the webpage to determine differences between the elements of the baseline geometry of the webpage and the elements of the geometry of the image of the webpage as rendered on the at least one target browser, wherein a report including a list of errors associated with the image of the webpage as rendered on the at least one target browser is generated, and wherein in response to a selection of an error from the list of errors, a visual indication of a portion of the image of the webpage that is associated with the selected error is provided.

8. The machine-readable storage device of claim 7, wherein the injected code comprises a scripting language code that is injected into the webpage by an editable proxy.

9. The machine-readable storage device of claim 8, wherein communicating the elements of the geometry of the image of the webpage comprises communicating the elements of the geometry of the image of the webpage to at least one of components in the server or components in the client machine, wherein the at least one of the components in the server or the components in the client machine performs the comparison, and at least some of the differences are for display at the client machine.

10. The machine-readable storage device of claim 8, wherein the elements of the geometry of the image of the webpage as rendered on the at least one target browser are provided by a software tool for determining elements of a document geometry.

11. The machine-readable storage device of claim 10, wherein the software tool performs at least one of the following: generating a unique identifier, calculating a position and a size of an element, determining if an element is a link and recording an associated href attribute, or writing information for each element to an XML document.

12. A system comprising:
one or more processors; and
one or more computer storage media storing computer-executable instructions that, when executed by the one or more processors, implement a method comprising:
at a server, providing a webpage for rendering on at least one target browser, wherein the webpage is injected with code that is used by the at least one target browser to determine elements of a geometry of an image of the webpage as rendered on the at least one target browser;
determining the elements of the geometry of the image of the webpage as rendered on the at least one target browser, wherein the elements of the geometry of the image of the webpage as rendered on the at least one target browser are determined by the at least one target browser based on the injected code, and wherein the elements of the geometry of the image of the webpage as rendered on the at least one target browser are determined in real time as a user input comprising a user interaction with the webpage at a client machine is received, the user input causing a corresponding operation to be performed by the server at the at least one target browser; and
communicating elements of a baseline geometry of the webpage and the elements of the geometry of the image of the webpage as rendered on the at least one target browser in order to determine, via a comparison, differences between the elements of the baseline geometry and the elements of the geometry of the image of the webpage as rendered on the at least one target browser and to generate a report including a list of errors associated with the image of the webpage as rendered on the at least one target browser, wherein in response to a selection of an error from the list of errors, a visual indication of a portion of the image of the webpage that is associated with the selected error is provided.

13. The system of claim 12, wherein the injected code comprises a scripting language.

14. The system of claim 12, wherein the elements of the baseline geometry of the webpage and the elements of the geometry of the image of the webpage as rendered on the at least one target browser are communicated to at least one of components at the server or components at the client machine, wherein the at least one of the components at the server or the components at the client machine performs the comparison, and at least some of the differences are for display at the client machine.

15. The system of claim 14, wherein determining the elements of the geometry of the image of the webpage is performed by a software tool comprising a document object model geometry service.

16. The system of claim 15, wherein the document object model geometry service performs at least one of the following: generating a unique identifier, calculating a position and a size of an element, determining if an element is a link and recording an associated href attribute, or writing information for each element to an XML document.

17. The system of claim 16, wherein the comparison comprises comparing the geometry of the image of the webpage as rendered on the at least one target browser against the elements of the baseline geometry, and wherein a solution to at least one error from the list of errors is provided in real time.

* * * * *